(12) United States Patent
Benda et al.

(10) Patent No.: US 12,524,401 B2
(45) Date of Patent: Jan. 13, 2026

(54) REVERSE ENGINEERED RETOKENIZATION FOR TRANSLATION OF MACHINE INTERPRETABLE LANGUAGES

(71) Applicant: Bank of America Corporation, Charlotte, NC (US)

(72) Inventors: Carl Benda, Charlotte, NC (US); Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 25 days.

(21) Appl. No.: 18/078,420

(22) Filed: Dec. 9, 2022

(65) Prior Publication Data
US 2024/0193161 A1    Jun. 13, 2024

(51) Int. Cl.
*G06F 16/2452* (2019.01)
*G06F 16/2455* (2019.01)
*G06F 16/27* (2019.01)

(52) U.S. Cl.
CPC .... *G06F 16/2452* (2019.01); *G06F 16/24553* (2019.01); *G06F 16/27* (2019.01)

(58) Field of Classification Search
CPC . G06F 16/2452; G06F 16/27; G06F 16/24553
See application file for complete search history.

(56) References Cited

U.S. PATENT DOCUMENTS

| | | |
|---|---|---|
| 8,027,970 B1 | 9/2011 | Brette et al. |
| 8,543,563 B1 | 9/2013 | Nikoulina et al. |
| 8,572,109 B1 | 10/2013 | Hodge et al. |
| 8,577,909 B1 | 11/2013 | Hodge et al. |
| 8,577,910 B1 | 11/2013 | Hodge et al. |
| 8,713,037 B2 | 4/2014 | Nikoulina et al. |
| 8,775,154 B2 | 7/2014 | Clinchant et al. |
| 8,914,395 B2 | 12/2014 | Jiang |
| 10,509,696 B1 * | 12/2019 | Gilderman .......... G06F 11/0727 |
| 11,023,461 B2 | 6/2021 | Rumiantsau et al. |
| 2009/0182547 A1 | 7/2009 | Niu et al. |
| 2009/0240675 A1 | 9/2009 | Asai et al. |
| 2010/0250575 A1 | 9/2010 | Lukiyanov et al. |
| 2011/0314010 A1 | 12/2011 | Ganti et al. |
| 2012/0011134 A1 | 1/2012 | Travnik et al. |

(Continued)

*Primary Examiner* — Van H Oberly
*Assistant Examiner* — Brooks T Hale
(74) *Attorney, Agent, or Firm* — Banner & Witcoff, Ltd.

(57) ABSTRACT

Aspects of the disclosure relate to translation of machine interpretable languages. A computing platform may receive a first query in a first format and a second query in a second format. The computing platform may extract non-essential parameters of the first query to produce a query key. The computing platform may generate, using the non-essential parameters of the first query and corresponding pointers, a dictionary of the non-essential parameters of the first query. The computing platform may generate a format statement for the first query by replacing, using the query key and the dictionary of the non-essential parameters, non-essential parameters within the second query with the corresponding pointers. The computing platform may store the format statement in a lookup table along with the query key. The computing platform may translate a third query to the second format using the query key and the format statement.

20 Claims, 11 Drawing Sheets

(56) References Cited

U.S. PATENT DOCUMENTS

| | | |
|---|---|---|
| 2012/0084301 A1 | 4/2012 | Samnowicz et al. |
| 2012/0330919 A1 | 12/2012 | Chen et al. |
| 2012/0330990 A1 | 12/2012 | Chen et al. |
| 2013/0198232 A1* | 8/2013 | Shamgunov ........ G06F 16/2471 707/770 |
| 2015/0339590 A1* | 11/2015 | Maarek .................. G06N 20/00 707/754 |
| 2016/0012124 A1 | 1/2016 | Ruvini et al. |
| 2016/0364452 A1 | 12/2016 | Devarao |
| 2019/0236617 A1* | 8/2019 | Gholston ............. G06Q 30/016 |
| 2019/0325292 A1* | 10/2019 | Remis ................ G06F 16/9024 |
| 2020/0334233 A1* | 10/2020 | Lee ........................ G06N 3/045 |
| 2022/0050840 A1 | 2/2022 | Parravicini et al. |

\* cited by examiner

420

| KEY | FORMATTED STATEMENT |
|---|---|
| SELECT*FROM$0WHERE$1=$2 | SELECT * FROM $0 WHERE $1 = $2 |

| KEY | DICTIONARY OF PARAMETERS | RECONSTRUCTED SQL STATEMENT |
|---|---|---|
| SELECT*FROM$0WHERE$1=$2 | {'$0':'students', '$1':'class_id', '$2':'XYZ'} | SELECT * FROM students WHERE class_id = XYZ; |
| SELECT*FROM$0WHERE$1=$2 | {'$0':'teachers', '$1':'class_id', '$2':'ABC'} | SELECT * FROM teachers WHERE class_id = ABC; |
| SELECT*FROM$0WHERE$1=$2 | {'$0':'students', '$1':'major', '$2':'MAJOR'} | SELECT * FROM students WHERE major = MAJOR; |
| SELECT*FROM$0WHERE$1=$2 | {'$0':'TAs', '$1':'class_id', '$2':'DEF'} | SELECT * FROM TAs WHERE class_id = DEF; |

| UNTRANSLATED TERADATA SQL | TRANSLATED SQL |
|---|---|
| SEL students, classes, cast (count(classes) as float) from school | SELECT STUDENTS, CLASSES CAST(COUNT(CLASSES) AS DECIMAL) FROM SCHOOL |
| KEY | DICTIONARY OF PARAMETERS |
| SEL$0,$1,CAST(COUNT($1)ASFLOAT)FROM$2 | {$0:students, $1:classes, $2:school,} |
| FORMAT STATEMENT GENERATION | |
| SELECT $0, $1 CAST(COUNT($1) AS DECIMAL) FROM $2 | |

FIG. 4F

REVERSE ENGINEERED RETOKENIZATION FOR TRANSLATION OF MACHINE INTERPRETABLE LANGUAGES

BACKGROUND

Aspects of the disclosure relate to computer hardware and software for processing machine interpretable languages and translating queries. A variety of different machine interpretable languages may be used to generate queries for execution against data warehouses/sources. In some instances, however, such a machine interpretable language may be incompatible with, or otherwise might not be in a preferred format for, query processing. While these incompatible queries can sometimes be converted manually between different languages, the process for doing so is typically time consuming, expensive, inaccurate, and/or otherwise detrimental to user experience. For example, machine interpretable language processing (MILP) may have innate limitations that make it different from natural language processing (NLP). For instance, MILP (unlike NLP) might not tolerate any error. Accordingly, although a human may still understand the meaning of a translation despite significant errors, if a translated query contains any errors such as missing punctuation, capitalization, or incorrect wording, a machine may fail to execute the query. Furthermore, most MILP jobs need to be processed in real time, which might not allow time for conversational improvements (as is offered in NLP). Accordingly, it remains difficult to perform translation of machine interpretable language queries in an effective, efficient, timely, and accurate manner.

SUMMARY

Aspects of the disclosure provide effective, efficient, scalable, and convenient technical solutions that address and overcome the technical problems associated with machine interpretable language translation. In accordance with one or more embodiments of the disclosure, a computing platform comprising at least one processor, a communication interface, and memory storing computer-readable instructions may receive a first query and a second query, where the first query may be formatted in a first format for execution on a first database, and the second query may be formatted in a second format for execution on a second database. The computing platform may extract non-essential parameters of the first query to produce a first query key. The computing platform may generate, using the non-essential parameters of the first query and corresponding pointers, a dictionary of the non-essential parameters of the first query. The computing platform may generate a first format statement for the first query by replacing, using the first query key and the dictionary of the non-essential parameters of the first query, non-essential parameters within the second query with the corresponding pointers. The computing platform may store the first format statement in a lookup table along with the first query key. The computing platform may receive a third query, formatted in the first format. The computing platform may extract non-essential parameters of the third query to produce a second query key. The computing platform may identify that the second query key matches the first query key. Based on identifying that the second query key matches the first query key, the computing platform may translate the third query to the second format by inputting the non-essential parameters of the third query into the first format statement. The computing platform may execute, after translating the third query into the second format, the third query on the second database.

In one or more instances, producing the lookup table may be in response to receiving a request to migrate information stored in the first database to the second database. In one or more instances, the computing platform may receive a fourth query, which may be formatted in the first format. The computing platform may extract non-essential parameters of the fourth query to produce a third query key. The computing platform may identify that the third query key does not match the first query key. Based on identifying that the third query key does not match the first query key, the computing platform may: 1) generate, using the non-essential parameters of the fourth query and corresponding pointers, a dictionary of the non-essential parameters of the fourth query, 2) generate a second format statement for the fourth query by replacing, using the third query key and the dictionary of the non-essential parameters of the fourth query, non-essential parameters within the fourth query with the corresponding pointers, and 3) store the second format statement in the lookup table along with the third query key.

In one or more examples, the computing platform may validate the first format statement prior to storing the first format statement in the lookup table. In one or more examples, the computing platform may receive a second format statement comprising a manually generated format statement for the first query, where: 1) generation of the first format statement corresponds to a first period of time, 2) generation of the manually generated format statement corresponds to a second period of time, and 3) the first period of time is less than the second period of time.

In one or more instances, automated format statement generation may correspond to a first error rate, manual format statement generation may correspond to a second error rate, and the first error rate may be lower than the second error rate. In one or more instances, the first error rate may remain constant as query complexity increases, and the second error rate may increase as the query complexity increases.

In one or more examples, the first query key may be a pre-verified query key. In one or more examples, the computing platform may identify whether the first query is formatted for execution at the second database, where extracting the non-essential parameters of the first query may be responsive to identifying that the query is not formatted for execution at the second database. In one or more examples, the third query might not be an exact match with the first query.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4F depict illustrative diagrams for translation of machine interpretable languages in accordance with one or more example embodiments;

DETAILED DESCRIPTION

Figure 1A:
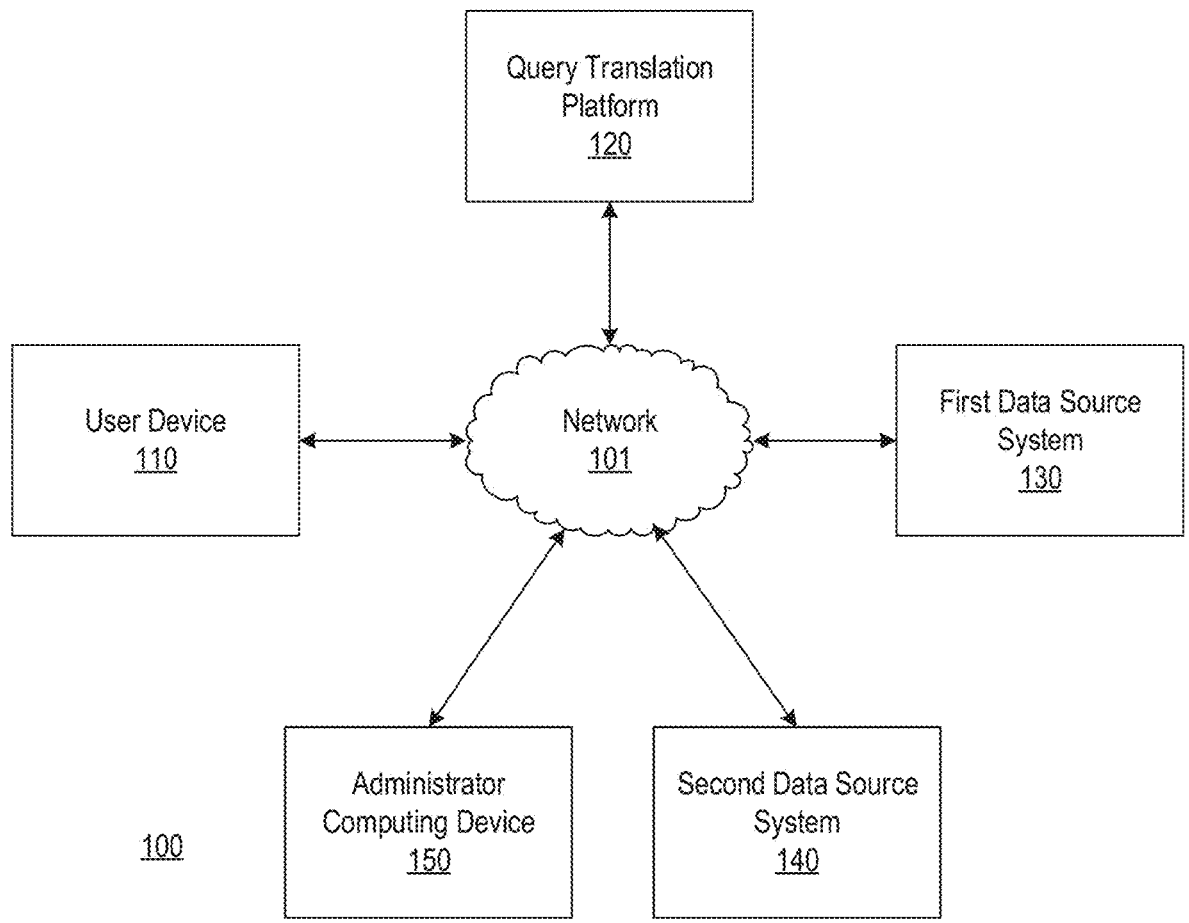
FIGS. 1A-1B depict an illustrative computing environment for translation of machine interpretable languages in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, queries (e.g., SQL queries, or the like) typically belong to a finite number of unique templates. As illustrated below, a given SQL input may be mapped to a specific translation included in a set of the pre-populated templates in a lookup table and then quickly reconstructed using its list of parameters. Additionally, as described further below, a transpiler may be used to automate translation of these SQL queries.

MILP has certain problems that may make it different from natural language processing (NLP) as explained in further detail below. For example, unlike NLP, MILP might not tolerate any error. A human may still understand the meaning despite significant errors present in the translation, whereas a machine may fail to execute a translation if there is missing punctuation, an incorrect keyword is used, if a word is not properly capitalized, and/or if other errors are made. In addition, compared to NLP, MILP needs to be performed very fast. Most MILP jobs may need real time processing, and they might not allow time or conversational improvements as may be offered in the case of NLP.

Accordingly, one or more aspects of the disclosure provide a solution for this translation problem, which may be referred to as transliteration. In transliteration, rather than creating a translation from scratch, a pre-formatted template may be used to create a valid machine understandable code. The transliteration problem may deal with two steps. First, given a code written in a particular machine language to be translated, the transliteration method may identify and pull up correctly a particular pre-formatted template that may be used to create a complete machine understandable code. Then, once the template is identified, it may be enhanced/customized based on the input to create a complete machine understandable code.

It may be important to make the query conversion process faster, cheaper, and more efficient. Many input queries may be very similar to one another, and may be mapped to the same template of another format (e.g., a different SQL format) (e.g., as shown in Table 405 of FIG. 4A). Accordingly, we may be able to quickly map an incoming query to a previously translated query template and reconstruct a valid SQL.

In some instances, the translated SQL may be significantly different from the original untranslated SQL. However, three inputs may be known: the key generated from the transliteration algorithm, the dictionary of parameters from the transliteration algorithm, and the translated SQL statement equivalent in functionality to the original SQL. Described herein is a reverse engineered retokenization process. For example, a mapping function may first identify the tokens to be replaced with the associated parameter mappings labeled in the tokenization process. With that mapping, the tokens may be replaced with the mapped identifiers associated with the original tokens. Then, a final pass may be made against the keys to ensure consistency, completeness, and to ensure that generalized reusability is maximized. This final step may ensure that the format statement may be usable across the most untransliterated SQL statements possible.

Several technical advantages may be achieved by this process. For example, a hand translated SQL statement may need to have the arguments and variables replaced with the appropriate labels (e.g., $, #, or other labels) in the format statement. Furthermore, as the complexity, length, and/or quantity of queries increases, human error may also be increased. Any single element that is not replaced correctly may cause the entire format statement to be invalid. By creating an algorithm and automated facility to replace arguments and variables from the parameter list with the associated labels not only removes the possibility of human error, but also may speed the creation and delivery of the format statements needed for transliteration.

Figure 1B:
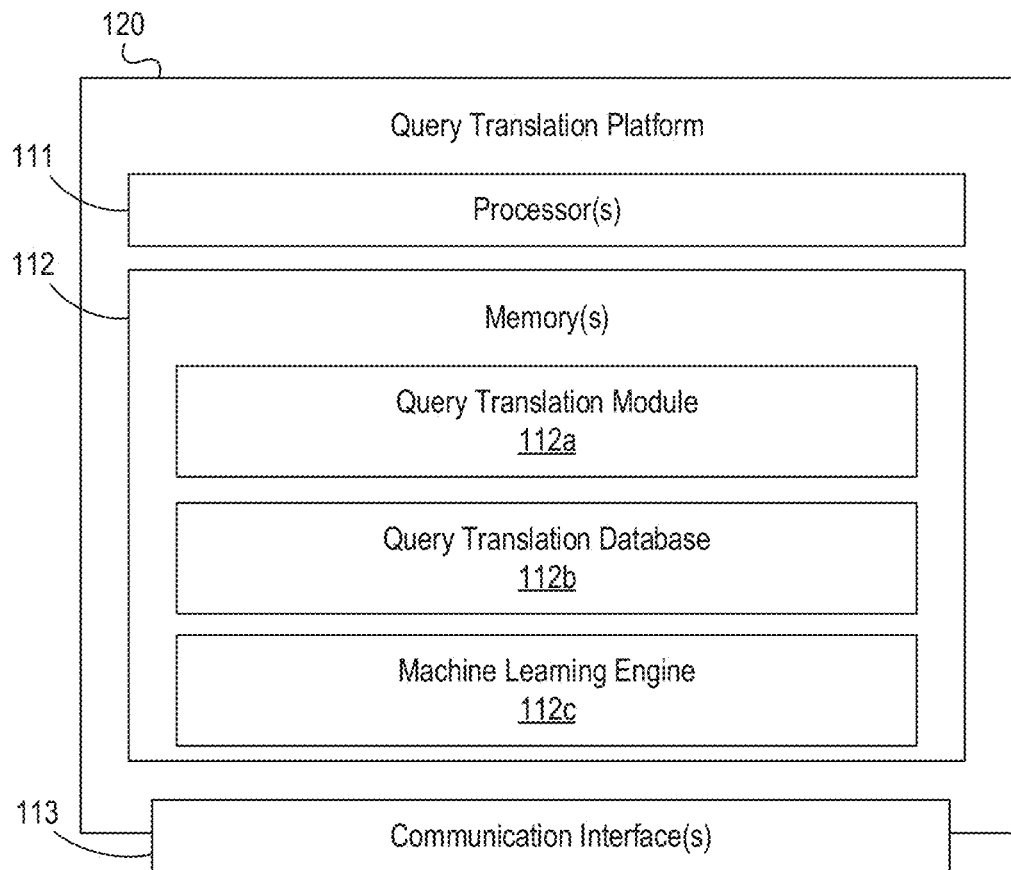

FIGS. 1A-1B depict an illustrative computing environment for reverse engineered retokenization for improved translation of machine interpretable languages in accordance with one or more example embodiments. Referring to FIG. 1A, computing environment 100 may include one or more computer systems. For example, computing environment 100 may include user device 110, query translation platform 120, first data source system 130, second data source system 140, and administrator computing device 150.

User device 110 may be and/or otherwise include a laptop computer, desktop computer, mobile device, tablet, smartphone, and/or other device that may be used by an individual to access a client application (that may e.g., be configured to transmit data queries). In some instances, user device 110 may be configured to display one or more user interfaces (e.g., query response interfaces, or the like). Although a single user device 110 is shown, any number of user devices may be deployed in the systems/methods described below without departing from the scope of the disclosure.

As described further below, query translation platform 120 may be a computer system that includes one or more computing devices (e.g., servers, server blades, or the like) and/or other computer components (e.g., processors, memories, communication interfaces) that may be used to provide query translation, query responses, and/or database migration services as described further below. In these instances, the query translation platform 120 may be configured with a custom driver configured to intercept database queries (e.g., from client applications running on, for example, the user device 110) to provide the translation, response, and/or migration services. In some instances, the query translation platform 120 may be configured to generate and/or otherwise store a lookup table that may include correlations between query keys and formatted query statements, which may, e.g., be used to improve the translation process for machine interpreted languages.

First data source system 130 may be one or more computing devices (e.g., servers, server blades, and/or other devices). In some instances, the first data source system 130 may be configured to store data in a first format (e.g., a source format). In some instances, the first data source system 130 may be configured to store data to be migrated to a second format (e.g., a target format corresponding to the second data source system 140).

Second data source system 140 may be one or more computing devices (e.g., servers, server blades, and/or other devices). In some instances, the second data source system 140 may be configured to store data in the second format. In these instances, the second data source system 140 may be configured to store data that has been migrated from the first format (e.g., the source format of the first data source system 130).

Administrator computing device 150 may be and/or otherwise include a laptop computer, desktop computer, mobile device, tablet, smartphone, and/or other device that may be used by an individual to initiate or otherwise request a database migration (e.g., from the first data source system 130 to the second data source system 140). In some instances, the administrator computing device 150 may be operated by a system administrator, network administrator, and/or other employee of an enterprise organization corresponding to the query translation platform 120, the first data source system 130, and/or the second data source system 140.

Computing environment 100 also may include one or more networks, which may interconnect user device 110, query translation platform 120, first data source system 130, second data source system 140, and/or administrator computing device 150. For example, computing environment 100 may include a network 101 (which may interconnect, e.g., user device 110, query translation platform 120, first data source system 130, second data source system 140, and/or administrator computing device 150).

In one or more arrangements, user device 110, query translation platform 120, first data source system 130, second data source system 140, and/or administrator computing device 150 may be any type of computing device capable of sending and/or receiving requests and processing the requests accordingly. For example, user device 110, query translation platform 120, first data source system 130, second data source system 140, administrator computing device 150 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of user device 110, query translation platform 120, first data source system 130, second data source system 140, and/or administrator computing device 150 may, in some instances, be special-purpose computing devices configured to perform specific functions.

Referring to FIG. 1B, query translation platform 120 may include one or more processors 111, memory 112, and communication interface 113. A data bus may interconnect processor 111, memory 112, and communication interface 113. Communication interface 113 may be a network interface configured to support communication between query translation platform 120 and one or more networks (e.g., network 101, or the like). Memory 112 may include one or more program modules having instructions that when executed by processor 111 cause query translation platform 120 to perform one or more functions described herein and/or one or more databases that may store and/or otherwise maintain information which may be used by such program modules and/or processor 111. In some instances, the one or more program modules and/or databases may be stored by and/or maintained in different memory units of query translation platform 120 and/or by different computing devices that may form and/or otherwise make up query translation platform 120. For example, memory 112 may have, host, store, and/or include query translation module 112a, query translation database 112b, and/or machine learning engine 112c.

Query translation module 112a may have instructions that direct and/or cause query translation platform 120 to provide improved database query translation and database migration, as discussed in greater detail below. Query translation database 112b may store information used by query translation module 112a and/or query translation platform 120 in application of advanced techniques to provide improved database query translation, database migration, and/or in performing other functions. Machine learning engine 112c may be used by the query translation module 112a and/or the query translation platform 120 to train, maintain, and/or otherwise refine translation model that may be used to provide enhanced database query translation and/or migration.

Figure 2A:
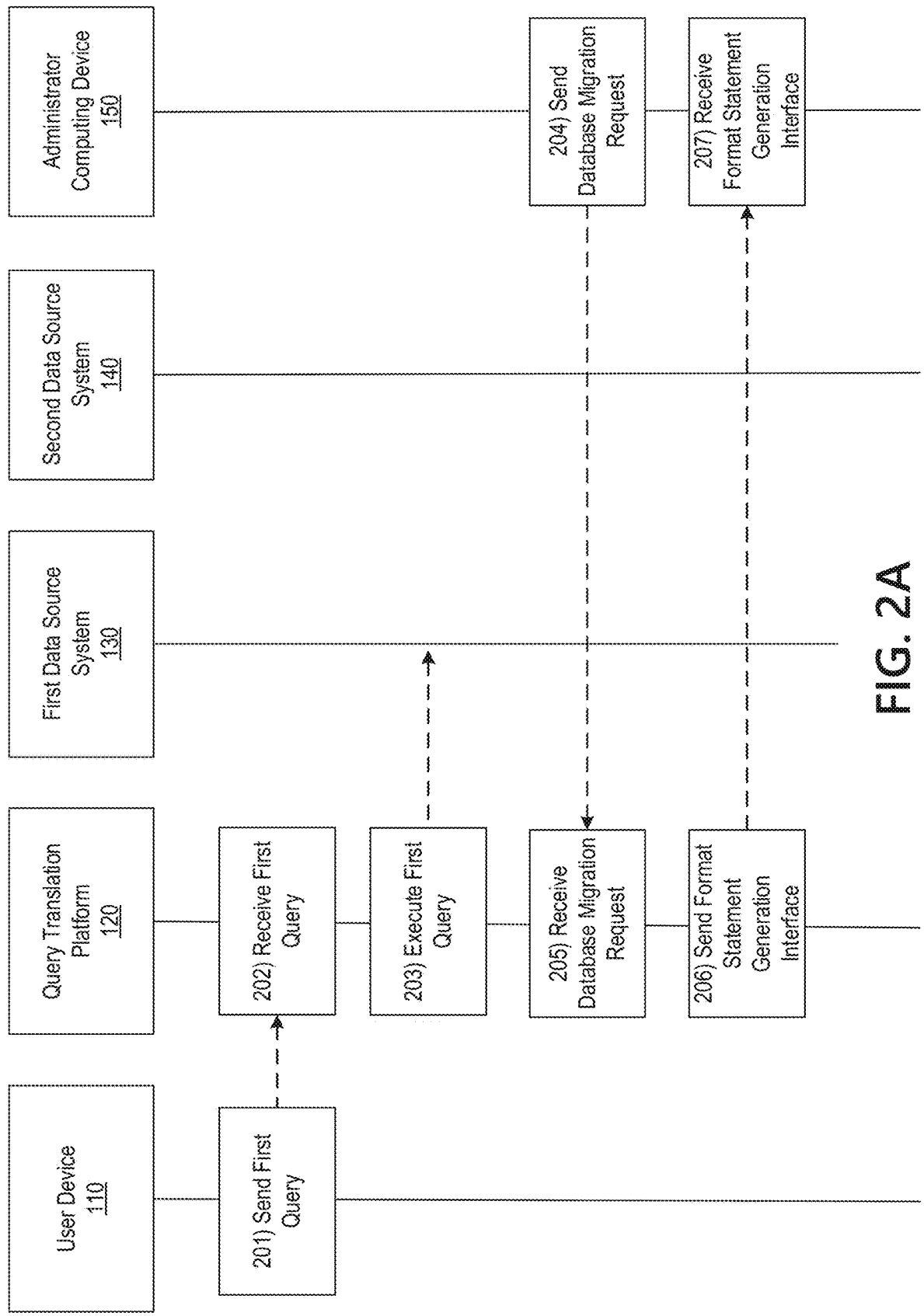
FIGS. 2A-2D depict an illustrative event sequence for translation of machine interpretable languages in accordance with one or more example embodiments.

FIGS. 2A-2D depict an illustrative event sequence for reverse engineered retokenization for improved translation in accordance with one or more example embodiments. Referring to FIG. 2A, at step 201, the user device 110 may send a first database query to the query translation platform 120. For example, the user device 110 may send a first database query formatted in a first format corresponding to the first data source 130. In some instances, the user device 110 may send the first database query while a wired or wireless data connection is established with the query translation platform 120.

At step 202, the query translation platform 120 may receive the first database query sent at step 201. For example, the query translation platform 120 may receive the first database query via the communication interface 113 and while a wired or wireless connection is established with the user device 110.

At step 203, the query translation platform 120 may execute the first database query on the first data source system 130 to produce a first query result. In these instances, the query translation platform 120 may then return the first query result to the user device 110.

At step 204, the administrator computing device 150 may send a database migration request to the query translation platform 120. For example, the administrator computing device 150 may send a request to migrate information stored in a source format (e.g., such as the first format corresponding to the first data source system 130) at the first data source system 130 to the second data source system 140 in a target format (e.g., such as the second format corresponding to the second data source system 140). In some instances, the database migration request may indicate the target format. In some instances, the administrator computing device 150 may send the database migration request to the query translation platform 120 while a wired or wireless data connection is established with the query translation platform 120.

At step 205, the query translation platform 120 may receive the database migration request, sent at step 204, from the administrator computing device 150. For example, the query translation platform 120 may receive the database migration request via the communication interface 113 and while a wired or wireless data connection is established with the administrator computing device 150.

At step 206, the query translation platform 120 may generate and/or otherwise send a format statement generation interface to the administrator computing device 150. For example, the query translation platform 120 may generate a graphical user interface (similar to graphical user interface 505, shown in FIG. 5), which may enable the input of a source query, a target query, and/or the corresponding query key, and may display an output of a formatted statement. Examples of such source query (e.g., untranslated query), target query (e.g., translated query), query key, and format statement are shown, for example, in Table 430 of FIG. 4F. In some instances, the query translation platform 120 may send the format statement generation interface to the administrator computing device 150 via the communication interface 113 and while a wired or wireless data connection is established with the administrator computing device 150. In some instances, the query translation platform 120 may also send one or more commands directing the administrator computing device 150 to display the format statement generation interface.

At step 207, the administrator computing device 150 may receive the format statement generation interface. For example, the administrator computing device 150 may receive the format statement while a wired or wireless data connection is established between the administrator computing device 150 and the query translation platform 120. In some instances, the administrator computing device 150 may also receive the one or more commands directing the administrator computing device 150 to display the format statement generation interface.

Figure 2B:
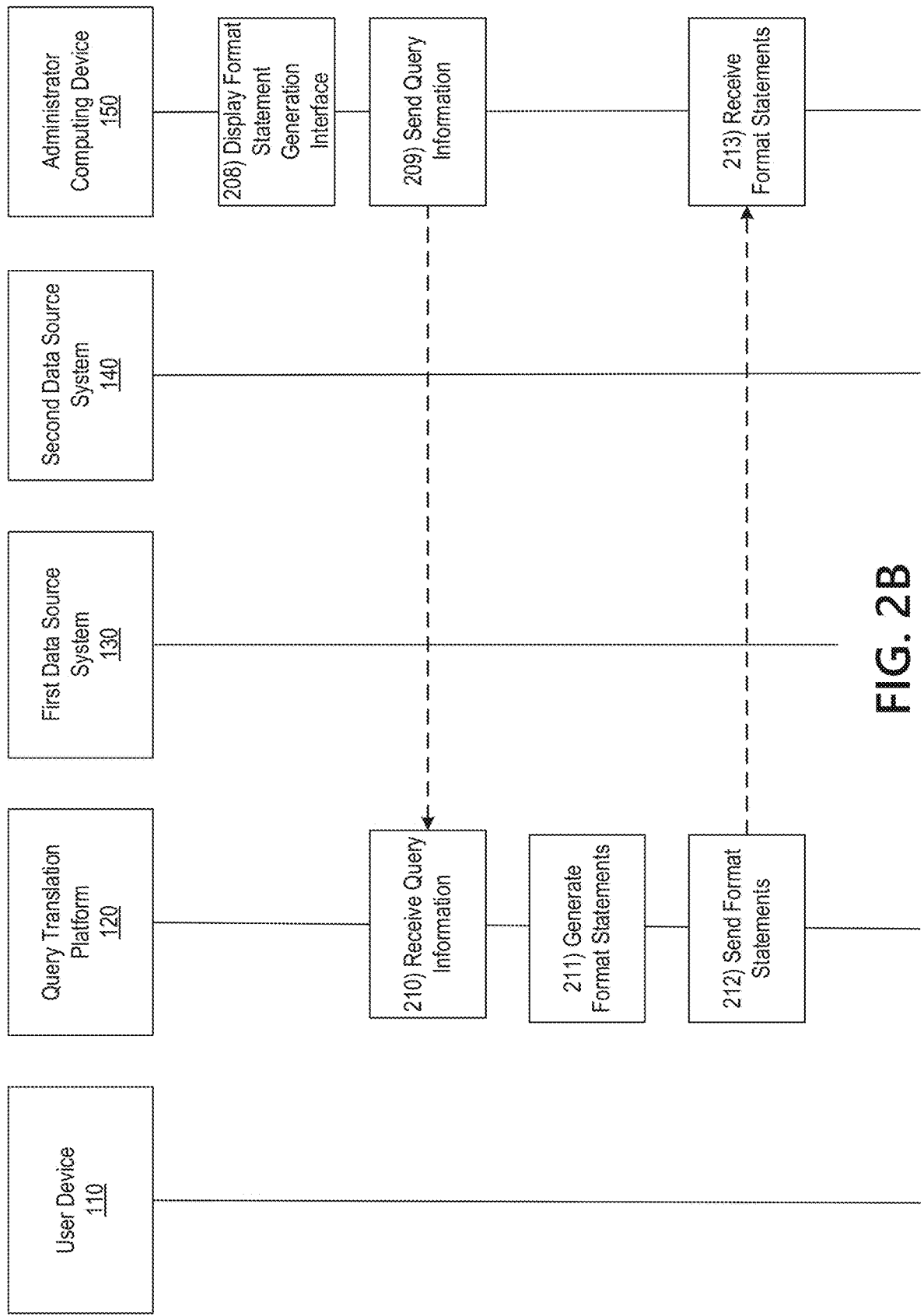

Referring to FIG. 2B, at step 208, based on or in response to the one or more commands directing the administrator computing device 150 to display the format statement generation interface, the administrator computing device 150 may display the format statement generation interface. For example, the query translation platform 120 may generate a graphical user interface (similar to graphical user interface 505, shown in FIG. 5), which may enable the input of a source query, a target query, the corresponding query key, and/or a corresponding dictionary of parameters, and may display an output of a formatted statement. Examples of such source query (e.g., untranslated query), target query (e.g., translated query), query key, dictionary of parameters, and format statement are shown, for example, in Table 430 of FIG. 4F.

At step 209, the administrator computing device 150 may receive query information via the format statement generation interface (e.g., source queries, target queries, dictionary of parameters, and/or query keys, input by a user of the administrator computing device 150), and may send the query information to the query translation platform 120. For example, the administrator computing device 150 may send the query information to the administrator computing device 150 while a wired or wireless data connection is established with the query translation platform 120.

At step 210, the query translation platform 120 may receive the query information sent at step 209. For example, the query translation platform 120 may receive the query information via the communication interface 113 and while a wired or wireless data connection is established between the administrator computing device 150 and the query translation platform 120.

Although receipt of the query translation information is described above as occurring via the query statement generation interface, such information may, in some instances, be automatically provided to the query translation platform 120 and/or generated by the query translation platform without departing from the scope of the disclosure. For example, in some instances, a source query and a target query may be automatically provided to the query translation platform 120, and the query translation platform 120 may automatically identify the query key by removing non-essential parameters from the source query and replacing them with pointers (as shown for example, in Table 415 of FIG. 4C). In doing so, the dictionary of parameters may also be produced.

At step 211, the query translation platform 120 may generate one or more formatted statements based on the query information received and/or otherwise identified. For example, the query translation platform 120 may reverse engineer a format statement, which may correspond to a given query key, into which non-essential parameters of a source query may be input to automatically translate the source query to a target format (e.g., and thus to produce a target query). For example, using the information from table 430 as an example, the query key and dictionary of parameters may be used to reduce the translated SQL to a format statement, which may, e.g., be a version of the translated SQL in which the non-essential parameters have been replaced by their corresponding pointers. For example, in the translated SQL of "SELECT STUDENTS, CLASSES CAST(COUNT(CLASSES) AS DECIMAL) FROM SCHOOL," the dictionary of parameters of "$0: students, $1: classes, $2 school" may be used to replace the non-essential parameters of "students," "classes," and "school" in the translated SQL accordingly to produce a format statement of "SELECT $0, $1 CAST(COUNT($1) AS DECIMAL) FROM $2." In doing so, the query translation platform 120 may produce a statement, formatted in the target format, and corresponding to a given query key, which may be used to automatically translate a source query from the source format to the target format.

For example, a subsequent source query may be reduced to a matching query key. In this example, the corresponding parameters (which might not be the same as those in the original source query, but may correspond to the same pointers, such as "$0: employees, $1: meetings, $2: office") may simply be inserted into the formatted statement to produce the target query. This translation process is described further below with regard to step 218.

In some instances, the query translation platform 120 may produce a format statement for each query key provided and/or otherwise identified based on the query information.

At step 212, the query translation platform 120 may send the format statement(s) produced at step 211 to the administrator computing device 150. For example, the query translation platform 120 may send the format statement(s) via the communication interface 113 and while a wired or wireless data connection is established with the administrator computing device 150. In some instances, the query translation platform 120 may also send one or more commands directing the administrator computing device 150 to display the format statement(s).

At step 213, the administrator computing device 150 may receive the format statement(s) sent at step 212. For example, the administrator computing device 150 may receive the format statement(s) while a wired or wireless data connection is established with the query translation platform 120. In some instances, the administrator computing device 150 may also receive the one or more commands directing the administrator computing device 150 to display the format statements.

Figure 2C:
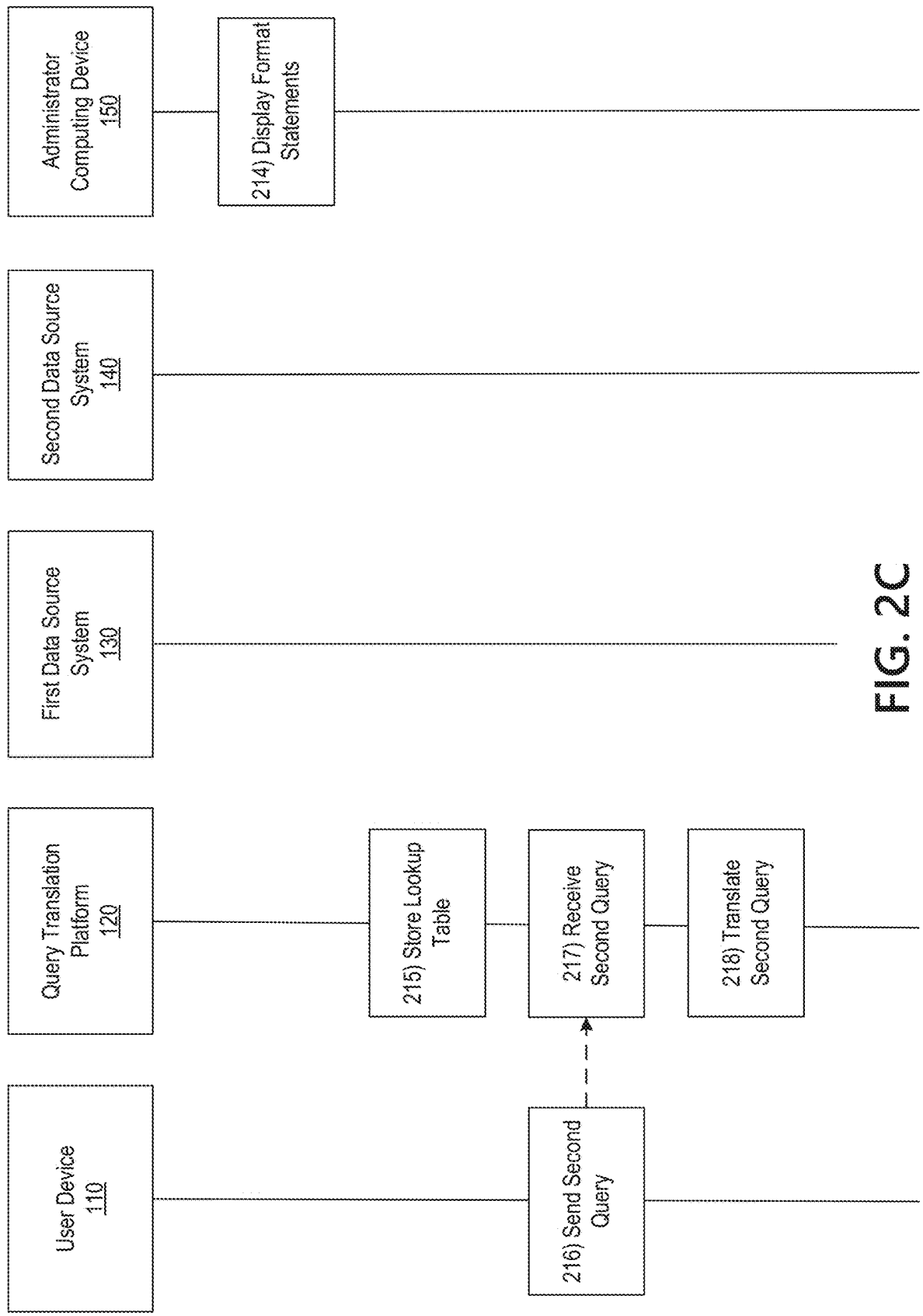
Figure 5:
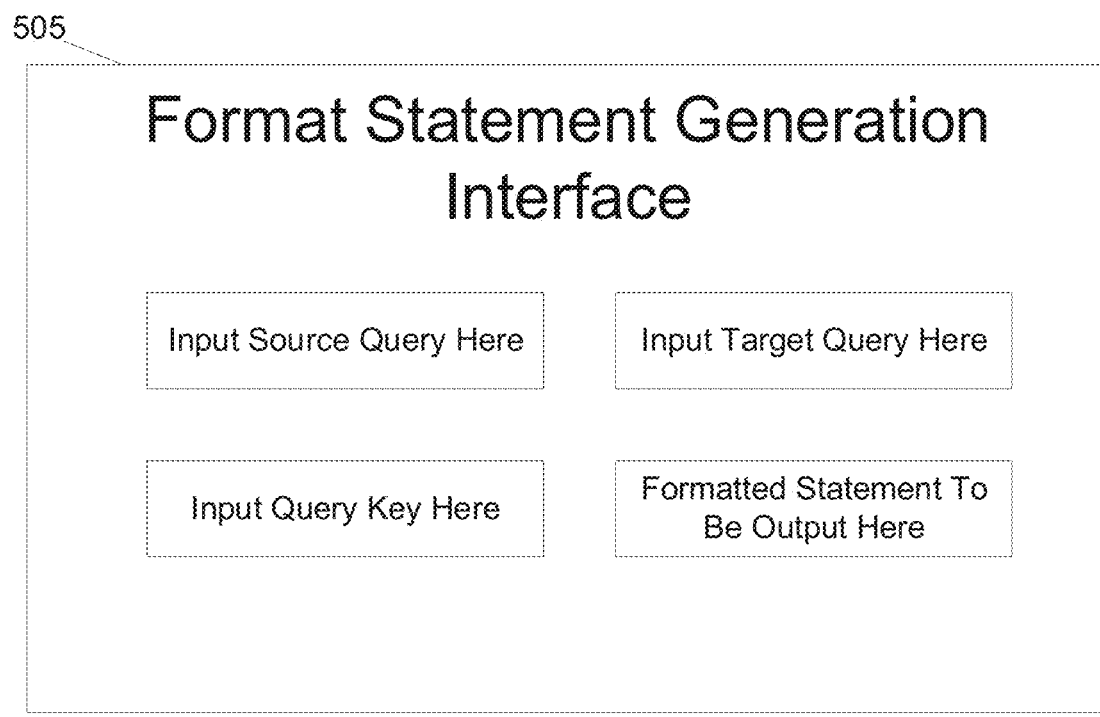
FIG. 5 depicts an illustrative user interface for translation of machine interpretable languages in accordance with one or more example embodiments.

Referring to FIG. 2C, at step 214, based on or in response to the one or more commands directing the administrator user device 150 to display the format statement(s), the administrator computing device 150 may display the format statement(s). For example, the administrator computing device 150 may display the format statement(s) within the format statement generation interface 505, as illustrated in FIG. 5.

At step 215, the query translation platform 120 may store a lookup table that includes query keys and their corresponding format statements (e.g., the format statement(s) produced at step 211). For example, the query translation platform 120 may store a table similar to table 420, which is shown in FIG. 4D. Although the illustrative lookup table includes only a single key/format statement pair, the lookup table may include any number of format statements and their corresponding query keys (e.g., any format statements generated at step 211). In some instances, the query keys may be pre-verified (e.g., manually and/or automatically reviewed to ensure accuracy). In doing so, the query translation platform 120 may establish a searchable table that includes the relationships between query keys and their corresponding format statements. Accordingly, the query key for a given input/source/untranslated query may be searched in the lookup table. If a match is identified, the corresponding format statement may be used for translation. If a match is not identified, the format statement may be generated as described above with regard to step 211, and subsequently may be added to the lookup table. In some instances, the process of producing and/or storing the lookup table may be in response to a request to perform a data migration (e.g., from the first data source system 130 to the second data source system 140). In some instances, the query translation platform 120 may validate the format statement(s) prior to storing them in the lookup table.

At step 216, the user device 110 (e.g., a client application at the user device 110) may send second database query to the query translation platform 120 (e.g., while a wired or wireless data connection is established with the query translation platform 120), which may be formatted in the first format for execution on the first data source system 930.

At step 217, the query translation platform 120 may receive the second database query from the client application. For example, the query translation platform 120 may receive a second database query formatted in a first format (e.g., a source format) corresponding to a first database (e.g., the first data source system 130). In these instances, the query translation platform 120 may utilize the custom driver to intercept the second database query prior to routing the second database query for execution on a database. For example, in receiving the second database query, the query translation platform 120 may receive a query formatted in a machine interpretable language such as C, C++, Python, SQL, and/or other machine interpretable languages. In these examples, the query translation platform 120 may receive a query that includes essential parameters (e.g., keywords, symbols, and/or other parameters) and non-essential parameters (specific columns, rows, data ranges, letter case, spaces, tabs, new lines, and/or other parameters). In some instances, the second database query may already be formatted in the target format (e.g., the second format). In these instances, the query translation platform 120 may proceed to execute the second database query on the second data source system 140 without performing the translation steps described below.

At step 218, the query translation platform 120 may translate the second database query from the first format of the first data source system 130 to a second format of the second data source system 140. For example, the query translation platform 120 may translate the input database query using the lookup table generated at step 215. In some instances, the query translation platform 120 may perform such translation as a result of a database migration (e.g., migrating data stored in the source format at the first data source system 130 to the second data source system 140 in the target format). Additionally or alternatively, the query translation platform 120 may perform such translation in response to identifying that the second database query is not formatted for execution at the target database (e.g., the second data source system 140). Rather than causing the user device 110 or the client application to be reprogrammed to generate queries in the target format, the query translation platform 120 may be configured to translate database queries (such as the input database query) from the source format to the target format for seamless execution on the second data source system 140. For example, many client applications may rely on data stored at the first data source system 130, and thus the query translation platform 120 may translate the data without re-engineering all of these client applications (which may, for example, consume significant time and computer processing resources, and/or introduce many possibilities for error and inefficiency).

In some instances, the query translation platform 120 may perform the translation in response to or based on occurrence of a data migration. For example, an enterprise organization may migrate data from a first format (stored at a first location/warehouse) to a second format (stored at a second location/warehouse). As a result, client applications configured to produce queries in the first format may otherwise be unable to execute queries against the second warehouse without otherwise rewriting the queries.

In some instances, to perform the translation, the query translation platform 120 may trap the database queries at the point of execution rather than causing client applications to rewrite the queries. For example, the query translation platform 120 may cause client applications to point to a custom driver (or driver wrapper) configured for query translation rather than a previous driver.

In some instances, the query translation platform 120 may use the lookup table to perform the translation. For example, the query translation platform 120 may identify that most source database queries fit into a few standard formats or patterns, and may use these standard formats/patterns to identify corresponding output/translated queries in the target format. By implementing the lookup table (which may, e.g., include the lookup table stored at step 203), the query translation platform 120 may perform a lookup function based on a format of a database query to quickly identify a translated query.

For example, the query translation platform 120 may extract non-essential portions of the second database query. For example, the query translation platform 920 may extract cases and/or instances of keywords, spaces, tabs, newlines, and/or other non-essential parameters, and might not extract ordering, word locations, formatting, and/or other essential parameters. For example, as illustrated in table 415 of FIG. 4C, the second database query may be "select * FROM students WHERE class_id=XYZ" and the query translation platform 120 may remove "students," "class_id," and "XYZ," from the database query to leave only the essential portions (which may, e.g., make up and/or otherwise form the query structure: "select * FROM _____ WHERE _____=_____").

Figures 4A, 4B, 4C:
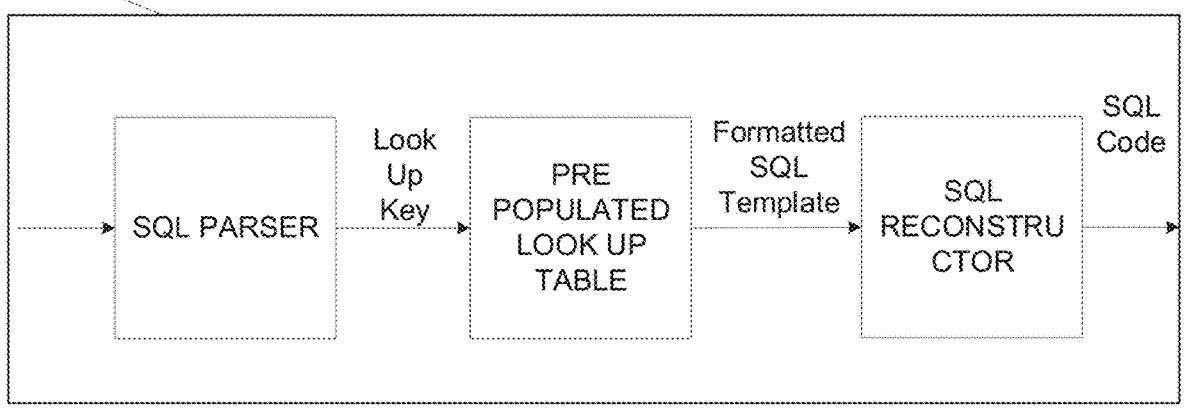

The query translation platform 120 may replace the extracted non-essential portions of the second database query with pointers. For example, referring back to FIG. 4C and the example described above, the query translation platform 120 may replace "students" with a first pointer "$0," "class_id" with a second pointer "$1," and "XYZ" with a third pointer "$2." In doing so, the query translation platform 120 may generate a source query key corresponding to the second database query. For example, the source query key for the second database query may be "select*FROM$0WHERE$1=$2," as illustrated in FIG. 4C.

The query translation platform 120 may store the non-essential portions of the database query as query parameters. For example, the query translation platform 120 may store the query parameters along with the source query key (e.g., as a label for the source query key). In the example above, the query translation platform 120 thus may store "students," "class_id," and "XYZ" as query parameters.

The query translation platform 120 may perform a lookup function on the lookup table to identify whether there is a match with the query key. Once the query translation platform 120 identifies a match between the source query key and one of the stored query keys, the query translation platform 120 may identify a corresponding formatted query statement (e.g., formatted in the second/target format). By identifying that the formatted query statement corresponds to the query key, the query translation platform 120 may verify that the formatted query statement corresponds to the second database query. In these instances, the formatted query statement may include pointers corresponding to the pointers in the query key. In some instances, the query key may be representative of multiple different source queries. For example, two source queries may include different non-essential parameters, but may include a common structure and/or essential parameters. Accordingly, this query key may be used to perform translations for multiple different queries, which might not be exact matches of each other. If a matching query key is not identified in the lookup table, the query translation platform 120 may generate a corresponding format statement for the second database query as is described above with regard to step 211. Additionally or alternatively, the query translation platform 120 may generate the corresponding format statement based on manual input. In these instances, however, automated generation of the corresponding format statement may occur within a first period of time, whereas manual generation of the corresponding format statement may occur within the second period of time, where the first period of time may be less than the second period of time. Additionally or alternatively, the automated generation of the corresponding format statement may occur with a first error rate, whereas manual generation of the corresponding format statement may occur with a second error rate, where the first error rate is lower than the second error rate.

Otherwise, if a matching query key is identified, the query translation platform 120 may identify the format statement, stored in the lookup table, corresponding to the matching query key.

For example, referring back to the Table 420 of FIG. 4D, if a query key of "SELECT*FROM$0WHERE$1=$2" is identified by removing the non-essential parameters from the second database query, a match may be identified in the lookup table. Then, the corresponding formatted statement of "SELECT * FROM $0 WHERE $1=$2" may be identified. As another example, as shown Table of in 430 FIG. 4F, if the key of "SEL$0,$1.CAST(COUNT($1)ASFLOAT) FROM$2" is identified, the corresponding formatted statement of "SELECT $0, $1 CAST(COUNT($1) AS DECIMAL) FROM $2" may be selected.

After selecting the format statement, the query translation platform may input the query parameters (e.g., from the dictionary of parameters) into the format statement. For example, the query translation platform 120 may replace the pointers in the identified format statement with the query parameters associated with each corresponding pointer from the dictionary of parameters. For example, when referring to the example in Table 430 in FIG. 4F, the query translation platform 120 may replace, in the format statement "$0" with "students," "$1" with "classes," and "$2" with "school." In doing so, the query translation platform 120 may produce an output query in the target dialect that corresponds to the second database query in the source dialect (which may, e.g., result in a query configured for execution on the second data source system 140).

Such a method may have two primary technical advantages over other translation methods. First, the speed of translation may be increased. For example, by executing a lookup function to identify a matching query key, the query translation platform 120 may avoid inefficiencies and/or other processing delays caused by the use of other language processing techniques in translation. Accordingly, the speed of translation may be faster for automated translation than for manual translation. In some instances, however, where automated translation is unavailable, manual translation may be performed (e.g., including manual generation of format statements). Second, the error rate of query translation may be reduced. For example, as the complexity, length, and/or quantity of queries is increased, the rate of human error in translation may also be increased. In contrast, such an error rate may remain constant when automated translation is performed using the methods described above. Accordingly, the error rate of automated translation may be lower than the error rate of manual translation. Such accuracy may be especially important given the lack of error tolerance for machine interpretable languages.

This translation may be further illustrated, for example, in diagram 410 of FIG. 4B. For example, the input SQL code may be fed into a parser, which may be used to perform the compaction and identify a corresponding query key. The key may then be used to perform a lookup function on the pre-populated lookup table to identify a formatted SQL template. The parameters of the input SQL code may then be fed into the reconstructor along with the formatted SQL template to produce a translated output query. This reconstruction is shown, for example, in tables 420 of FIG. 4D, and 425 of FIG. 4E. For example, a key may be matched to a formatted statement as shown in table 420, and the parameters for the corresponding key (as shown in table 425) may be input into the formatted statement to produce a reconstructed SQL statement.

In some instances, the query translation platform 120 may identify that the database query is already formatted for execution on the second data source system 140. In these instances, the query translation platform 120 may execute the database query on the second data source system 140 (e.g., proceed to step 219) without performing the above described translation.

Figure 2D:
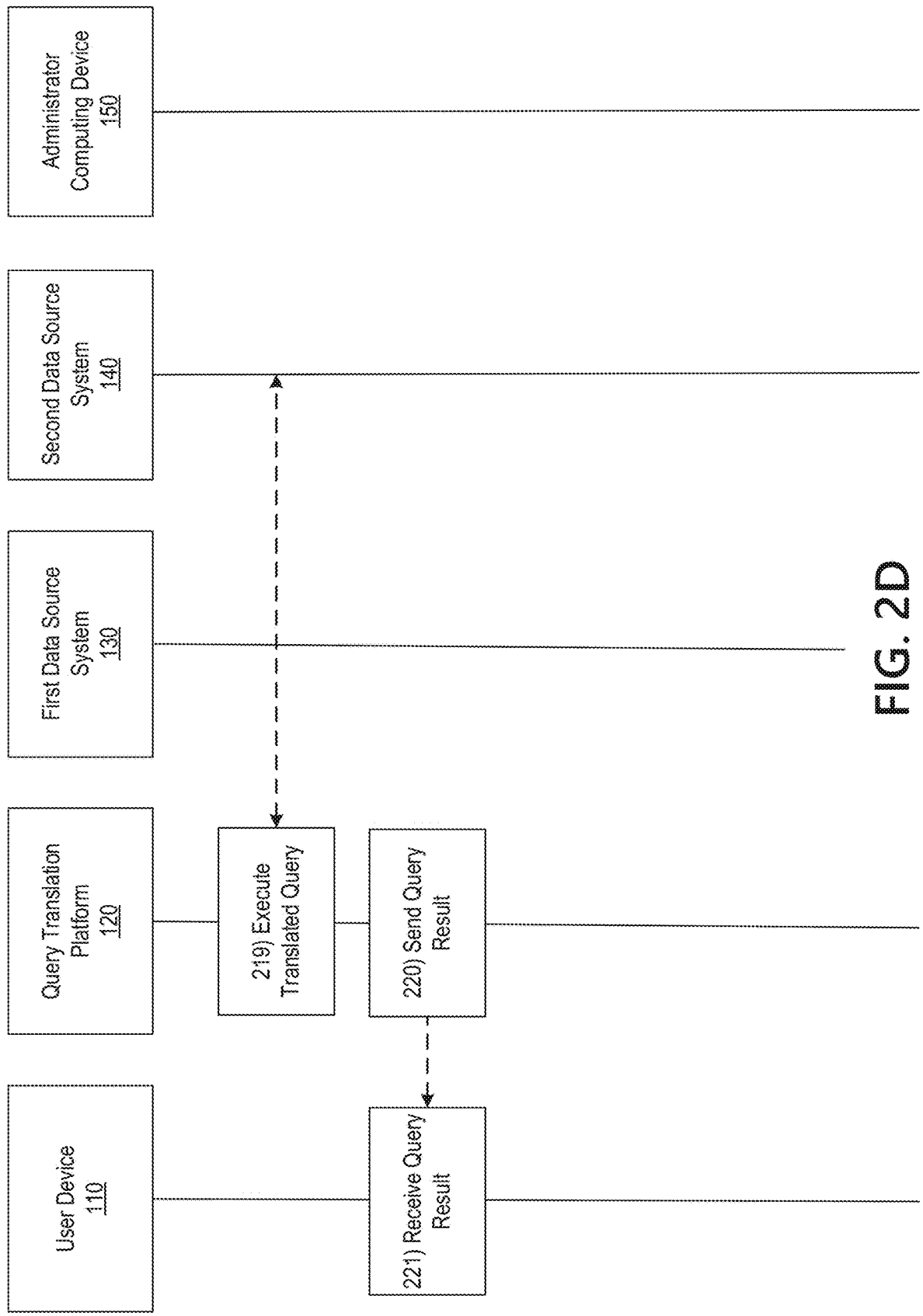

Referring to FIG. 2D, at step 219, the query translation platform 120 may execute the translated database query on the second data source system 140 to produce a query result. At step 220, the query translation platform 120 may send (e.g., while the wired or wireless data connection is established between the query translation platform 120 and the user device 110) the query result to the user device 110 (e.g., to the client application). At step 221, user device 110 may receive the query result.

Figure 3:
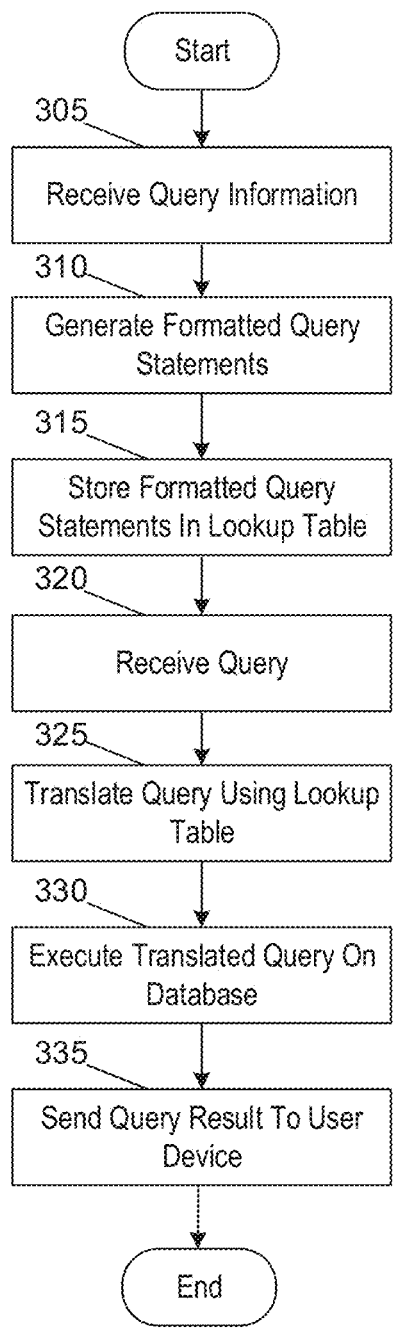
FIG. 3 depicts an illustrative method for translation of machine interpretable languages in accordance with one or more example embodiments.

FIG. 3 depicts an illustrative method for reverse engineered retokenization for improved translation of machine interpretable languages in accordance with one or more example embodiments. At step 305, the computing platform may receive query information. At step 310, the computing platform may generate formatted query statements using the query information. At step 315, the computing platform may store a lookup table that includes the formatted query statements. At step 320, the computing platform may receive an input query. At step 325, the computing platform may translate the input query, using the lookup table, to produce an output (e.g., translated) query. At step 330, the computing platform may execute the output query against a data source to produce a query result. At step 335, the computing platform may send the query result to a user device.

Figure 6:
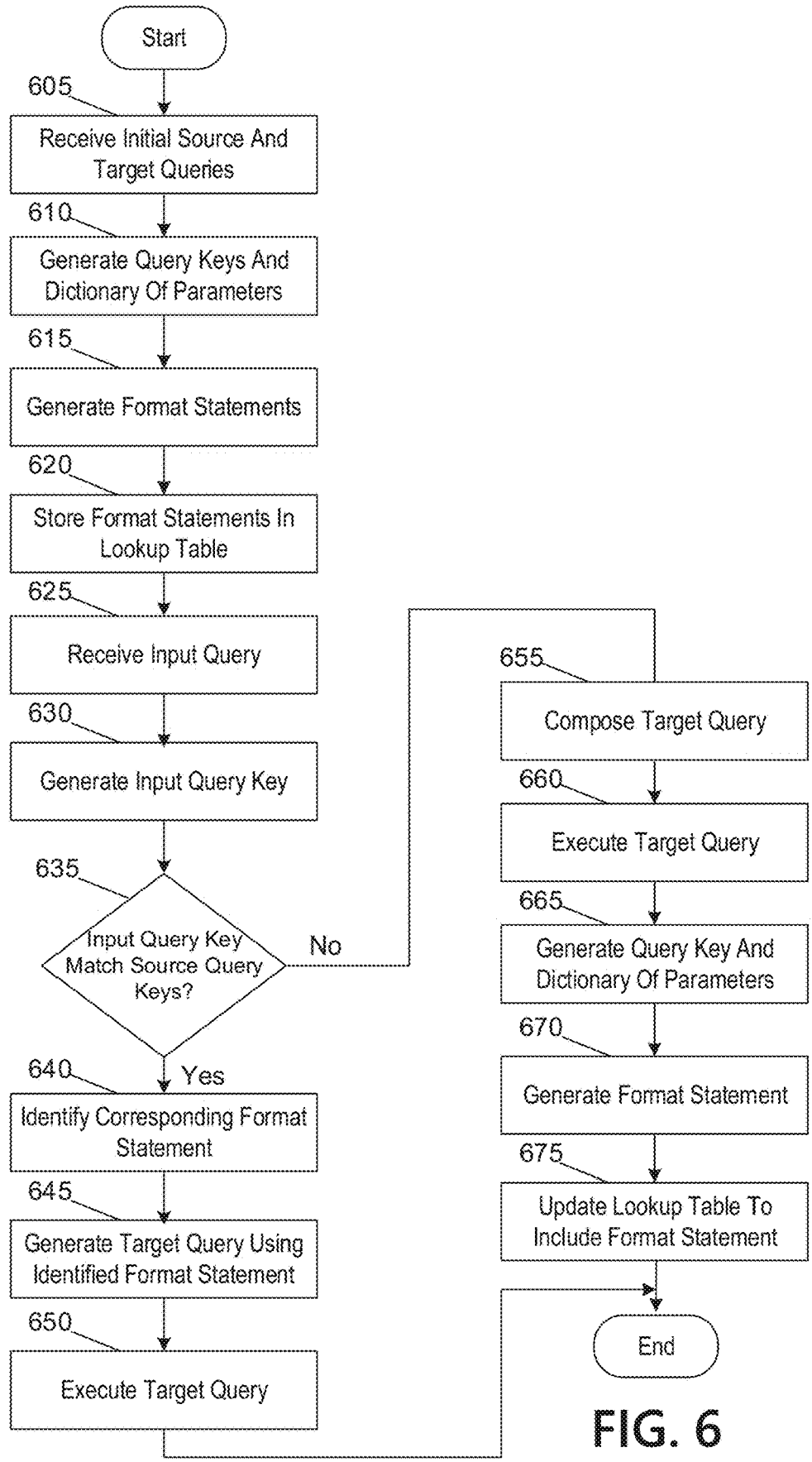
FIG. 6 depicts an illustrative method for translation of machine interpretable languages in accordance with one or more example embodiments.

FIG. 6 depicts an illustrative method for reverse engineered retokenization for improved translation of machine interpretable languages in accordance with one or more example embodiments. At step 605, the computing platform may receive initial source and target queries. At step 610, the computing platform may generate query keys and a dictionary of parameters. At step 615, the computing platform may generate format statements for the initial source queries. At step 620, the computing platform may store the format statements in a lookup table. At step 625, the computing platform may receive an input query. At step 630, the computing platform may generate an input query key based on the input query. At step 635, the computing platform may identify whether or not the input query key matches any of the query keys in the lookup table. If a match is identified, the computing platform may proceed to step 640.

At step 640, the computing platform may identify the format statement for the matching query key. At step 645, the computing platform may generate a target query using the identified format statement. At step 650, the computing platform may execute the target query.

Returning to step 635, if the computing platform identifies that the input query key does not match any of the query keys in the lookup table, the computing platform may proceed to step 655. At step 655, the computing platform may compose the target query for the input query. At step 660, the computing platform may execute the target query. At step 665, the computing platform may generate a query key and a dictionary of parameters for the input query. At step 670, the computing platform may generate a format statement corresponding to input query. At step 675, the computing platform may update the lookup table to include the format statement.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive a first query and a second query, wherein:
   the first query is formatted in a first format for execution on a first database, wherein the first query is formatted according to a plurality of machine interpretable languages, and the second query is formatted in a second format for execution on a second database;

extract non-essential parameters of the first query to produce a first query key;

generate, using the non-essential parameters of the first query and corresponding pointers, a dictionary of the non-essential parameters of the first query;

generate a first format statement for the first query by replacing, using the first query key and the dictionary of the non-essential parameters of the first query, non-essential parameters within the second query with the corresponding pointers;

store the first format statement in a lookup table along with the first query key;

receive a third query, formatted in the first format, wherein the third query is not an exact match with the first query;

extract non-essential parameters of the third query to produce a second query key;

identify that the second query key matches the first query key;

based on identifying that the second query key matches the first query key, translate the third query to the second format by inputting the non-essential parameters of the third query into the first format statement, wherein the translation of the third query is executed by a machine learning engine that trains, maintains, and refines a translation model configured to perform database query translation; and execute, after translating the third query into the second format, the third query on the second database.

2. The computing platform of claim 1, wherein producing the lookup table is in response to receiving a request to migrate information stored in the first database to the second database.

3. The computing platform of claim 1, wherein the memory stores additional computer-readable instructions that, when executed by the at least one processor, cause the computing platform to:

receive a fourth query, formatted in the first format;

extract non-essential parameters of the fourth query to produce a third query key;

identify that the third query key does not match the first query key; and based on identifying that the third query key does not match the first query key:

generate, using the non-essential parameters of the fourth query and corresponding pointers, a dictionary of the non-essential parameters of the fourth query, generate a second format statement for the fourth query by replacing, using the third query key and the dictionary of the non-essential parameters of the fourth query, non-essential parameters within the fourth query with the corresponding pointers, and store the second format statement in the lookup table along with the third query key.

4. The computing platform of claim 1, wherein the memory stores additional computer-readable instructions that, when executed by the at least one processor, cause the computing platform to:

validate the first format statement prior to storing the first format statement in the lookup table.

5. The computing platform of claim 1, wherein the memory stores additional computer-readable instructions that, when executed by the at least one processor, cause the computing platform to:

receive a second format statement comprising a manually generated format statement for the first query, wherein:

generation of the first format statement corresponds to a first period of time, generation of the manually generated format statement corresponds to a second period of time, and the first period of time is less than the second period of time.

6. The computing platform of claim 1, wherein:

automated format statement generation corresponds to a first error rate, manual format statement generation corresponds to a second error rate, and the first error rate is lower than the second error rate.

7. The computing platform of claim 6, wherein:

the first error rate remains constant as query complexity increases, and the second error rate increases as the query complexity increases.

8. The computing platform of claim 1, wherein the first query key comprises a pre-verified query key.

9. The computing platform of claim 1, wherein the memory stores additional computer-readable instructions that, when executed by the at least one processor, cause the computing platform to:

identify whether the first query is formatted for execution at the second database, wherein extracting the non-essential parameters of the first query is responsive to identifying that the query is not formatted for execution at the second database.

10. The computing platform of claim 1, wherein:

producing the first query key comprises generating a query key of SELECT*FROM$0WHERE$1-$2; and generating the first format statement comprises generating a statement of SELECT * FROM $0 WHERE $1=$2.

11. The computing platform of claim 1, wherein:

producing the first query key comprises generating a query key of SEL$0,$1,CAST(COUNT($1)AS-FLOAT)FROM$2; and generating the first format statement comprises generating a statement of SELECT $0, $1 CAST(COUNT$1) AS DECIMAL) FROM $2.

12. The computing platform of claim 1, wherein extracting the non-essential parameters comprises extracting: specific columns, rows, data ranges, letter case, spaces, tabs, and new lines, without extracting ordering, word locations, and formatting.

13. The computing platform of claim 1, wherein the plurality of machine interpretable languages comprises two or more of: C, C++, Python, or SQL.

14. A method comprising:

at a computing platform comprising at least one processor, a communication interface, and memory:

receiving a first query and a second query, wherein:

the first query is formatted in a first format for execution on a first database, wherein the first query is formatted according to a plurality of machine interpretable languages, and the second query is formatted in a second format for execution on a second database;

extracting non-essential parameters of the first query to produce a first query key;

generating, using the non-essential parameters of the first query and corresponding pointers, a dictionary of the non-essential parameters of the first query;

generating a first format statement for the first query by replacing, using the first query key and the dictionary of the non-essential parameters of the first query, non- essential parameters within the second query with the corresponding pointers;

storing the first format statement in a lookup table along with the first query key;

receiving a third query, formatted in the first format, wherein the third query is not an exact match with the first query;

extracting non-essential parameters of the third query to produce a second query key;

identifying that the second query key matches the first query key;

based on identifying that the second query key matches the first query key, translating the third query to the second format by inputting the non-essential parameters of the third query into the first format statement, wherein the translation of the third query is executed by a machine learning engine that trains, maintains, and refines a translation model configured to perform database query translation; and executing, after translating the third query into the second format, the third query on the second database.

15. The method of claim 14, wherein producing the lookup table is in response to receiving a request to migrate information stored in the first database to the second database.

16. The method of claim 14, further comprising:
receiving a fourth query, formatted in the first format;
extracting non-essential parameters of the fourth query to produce a third query key;
identifying that the third query key does not match the first query key; and
based on identifying that the third query key does not match the first query key:
generating, using the non-essential parameters of the fourth query and corresponding pointers, a dictionary of the non-essential parameters of the fourth query,
generating a second format statement for the fourth query by replacing, using the third query key and the dictionary of the non-essential parameters of the fourth query, non-essential parameters within the fourth query with the corresponding pointers, and
storing the second format statement in the lookup table along with the third query key.

17. The method of claim 14, further comprising:
validating the first format statement prior to storing the first format statement in the lookup table.

18. The method of claim 14, further comprising:
receiving a second format statement comprising a manually generated format statement for the first query, wherein:
generation of the first format statement corresponds to a first period of time,
generation of the manually generated format statement corresponds to a second period of time, and
the first period of time is less than the second period of time.

19. The method of claim 14, wherein:
automated format statement generation corresponds to a first error rate,
manual format statement generation corresponds to a second error rate, and
the first error rate is lower than the second error rate.

20. One or more non-transitory computer-readable media storing instructions that, when executed by a computing platform comprising at least one processor, a communication interface, and memory, cause the computing platform to:
receive a first query and a second query, wherein:
the first query is formatted in a first format for execution on a first database, wherein the first query is formatted according to a plurality of machine interpretable languages, and
the second query is formatted in a second format for execution on a second database;
extract non-essential parameters of the first query to produce a first query key;
generate, using the non-essential parameters of the first query and corresponding pointers, a dictionary of the non-essential parameters of the first query;
generate a first format statement for the first query by replacing, using the first query key and the dictionary of the non-essential parameters of the first query, non-essential parameters within the second query with the corresponding pointers;
store the first format statement in a lookup table along with the first query key;
receive a third query, formatted in the first format, wherein the third query is not an exact match with the first query;
extract non-essential parameters of the third query to produce a second query key;
identify that the second query key matches the first query key;
based on identifying that the second query key matches the first query key, translate the third query to the second format by inputting the non-essential parameters of the third query into the first format statement, wherein the translation of the third query is executed by a machine learning engine that trains, maintains, and refines a translation model configured to perform database query translation; and
execute, after translating the third query into the second format, the third query on the second database.

* * * * *